United States Patent
Johns

(10) Patent No.: US 11,452,311 B1
(45) Date of Patent: Sep. 27, 2022

(54) PHONE CASE VAPE PEN

(71) Applicant: Christopher Johns, Buckeye, AZ (US)

(72) Inventor: Christopher Johns, Buckeye, AZ (US)

(*) Notice: Subject to any disclaimer, the term of this patent is extended or adjusted under 35 U.S.C. 154(b) by 382 days.

(21) Appl. No.: 16/741,809

(22) Filed: Jan. 14, 2020

(51) Int. Cl.
| | |
|---|---|
| A24F 40/40 | (2020.01) |
| A24F 15/18 | (2006.01) |
| H04B 1/3888 | (2015.01) |
| A24F 40/50 | (2020.01) |

(52) U.S. Cl.
CPC ............ *A24F 40/40* (2020.01); *A24F 15/18* (2013.01); *H04B 1/3888* (2013.01); *A24F 40/50* (2020.01)

(58) Field of Classification Search
CPC ....... A24F 40/40; A24F 15/18; H04B 1/3888; H04M 1/215
See application file for complete search history.

(56) References Cited

U.S. PATENT DOCUMENTS

| | | | |
|---|---|---|---|
| 9,433,242 B1* | 9/2016 | Buffone | A24F 40/95 |
| 9,641,208 B2 | 5/2017 | Sela | |
| 9,668,518 B2 | 6/2017 | Esses | |
| 9,833,020 B2 | 12/2017 | Shabat | |
| 10,003,372 B2 | 6/2018 | Stanimirovic | |
| 10,274,198 B2 | 4/2019 | Tijerina | |
| 2014/0262934 A1* | 9/2014 | Fathollahi | A45C 13/002 206/774 |
| 2015/0097513 A1* | 4/2015 | Liberti | A24F 40/65 224/245 |
| 2015/0101940 A1* | 4/2015 | Ash | H04M 1/21 206/216 |
| 2015/0215439 A1* | 7/2015 | Stanimirovic | H04M 1/185 455/572 |
| 2016/0080535 A1* | 3/2016 | Stanimirovic | H04M 1/185 455/575.8 |
| 2019/0173508 A1* | 6/2019 | Martin | A24F 40/50 |

FOREIGN PATENT DOCUMENTS

EP 2903245 8/2015

* cited by examiner

*Primary Examiner* — Hae Moon Hyeon
(74) *Attorney, Agent, or Firm* — Kyle A. Fletcher, Esq.

(57) ABSTRACT

The phone case vape pen comprises a phone case, a battery, and a vape pen. The phone case detaches from a mobile phone. The vape pen slides within the phone case to expose the mouthpiece for use. The phone case houses the vape pen. A battery and a recharging connector for the vape pen are both contained within the phone case. Operational controls and one or more indicators are included on the phone case, and which relate to the use and function of the vape pen.

14 Claims, 5 Drawing Sheets

PHONE CASE VAPE PEN

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of vape pens and mobile phone cases, more specifically, a phone case vape pen.

SUMMARY OF INVENTION

The phone case vape pen comprises a phone case, a battery, and a vape pen. In some embodiments, the phone case may detachably couple to a mobile phone. In other embodiments, the vape pen may slide within the phone case to expose the mouthpiece for use. In other embodiments, the vape pen may slide out of the phone case and may detach from the phone case during use.

An object of the invention is to provide a phone case for a mobile phone.

Another object of the invention is to house a vape pen within the phone case.

A further object of the invention is to provide a battery and a recharging connector for the vape pen within the phone case.

Yet another object of the invention is to provide one or more operational controls and one or more indicators that are accessible on the outside surface of the phone case, which relate to the vape pen.

These together with additional objects, features and advantages of the phone case vape pen will be readily apparent to those of ordinary skill in the art upon reading the following detailed description of the presently preferred, but nonetheless illustrative, embodiments when taken in conjunction with the accompanying drawings.

In this respect, before explaining the current embodiments of the phone case vape pen in detail, it is to be understood that the phone case vape pen is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the phone case vape pen.

It is therefore important that the claims be regarded as including such equivalent construction insofar as they do not depart from the spirit and scope of the phone case vape pen. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
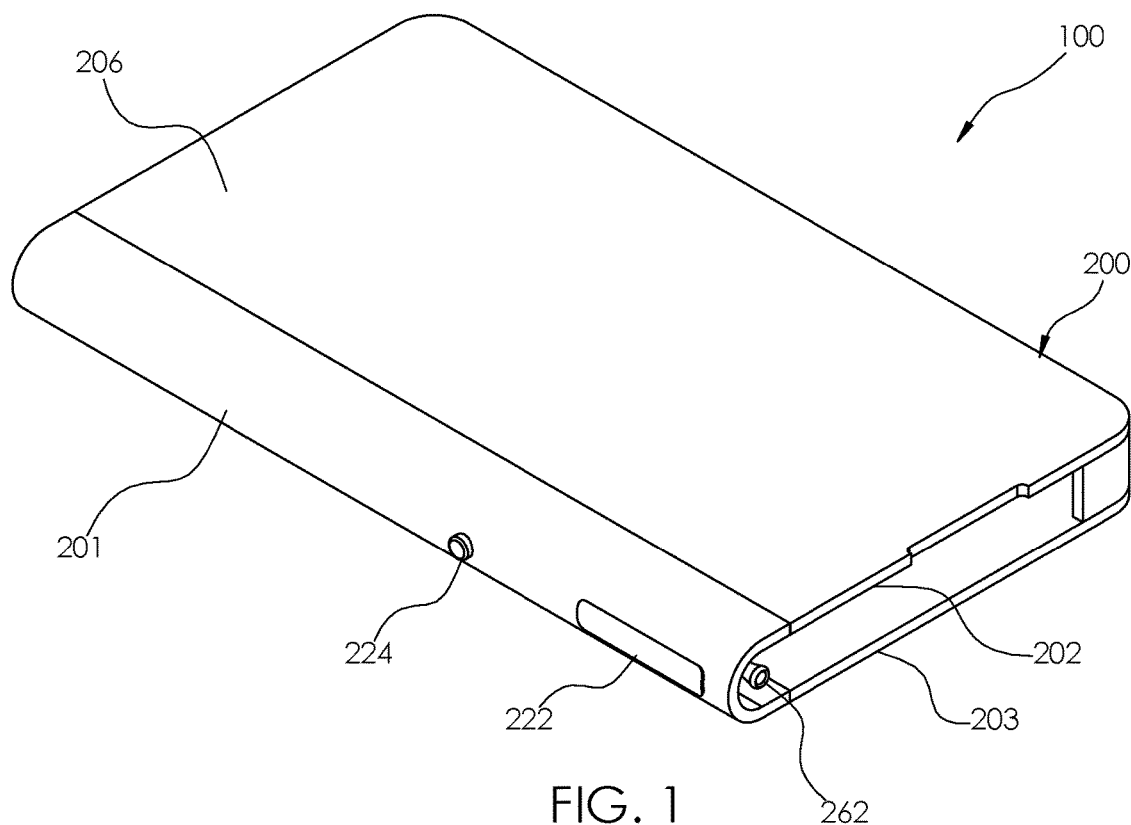
FIG. 1 is a perspective view of an embodiment of the disclosure.
Figure 2:
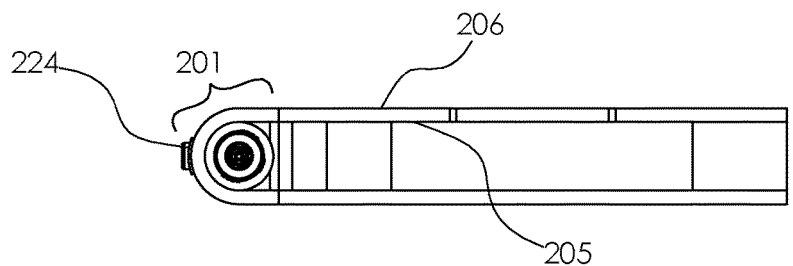
FIG. 2 is a bottom view of the device of FIG. 1.
Figure 3:
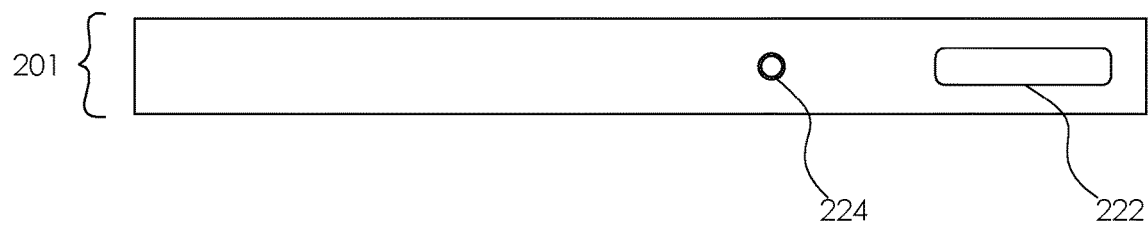
FIG. 3 is a side view of the device of FIG. 1.
Figure 4:
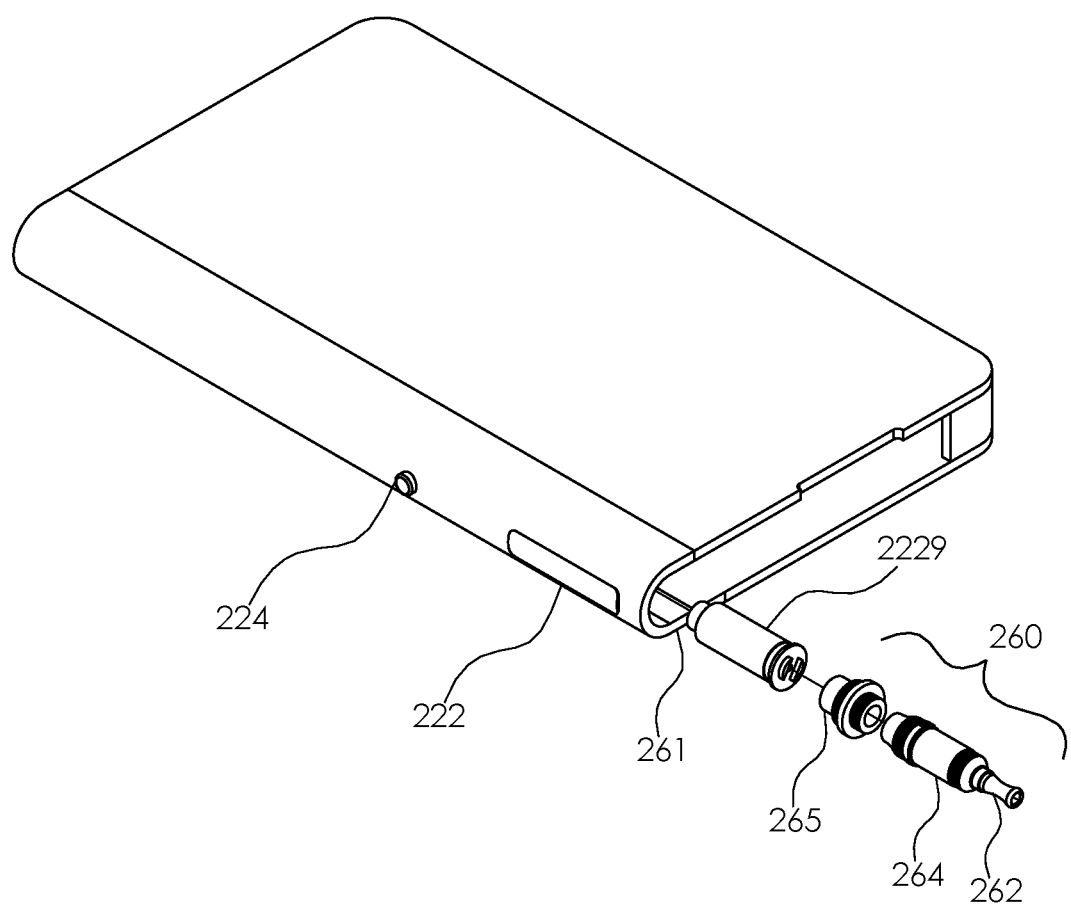
FIG. 4 is an exploded view of the device of FIG. 1.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 8.

The phone case vape pen 100 (hereinafter invention) comprises a phone case 200, and a vape pen 260. The phone case 200 may house a cell phone 300. Moreover, the phone case 200 may house the vape pen 260 as well.

The phone case 200 may be further defined with a hinging side 201, a front cover 202, and a rear cover 203. The hinge side 201 is positioned between the front cover 202 and the rear cover 203. Moreover, the vape pen 260 is positioned within a pen slot 261 formed in the phone case 200. The pen slot 261 is formed when the hinging side 201 is folded thereby enclosing the phone case 200.

Figure 6:
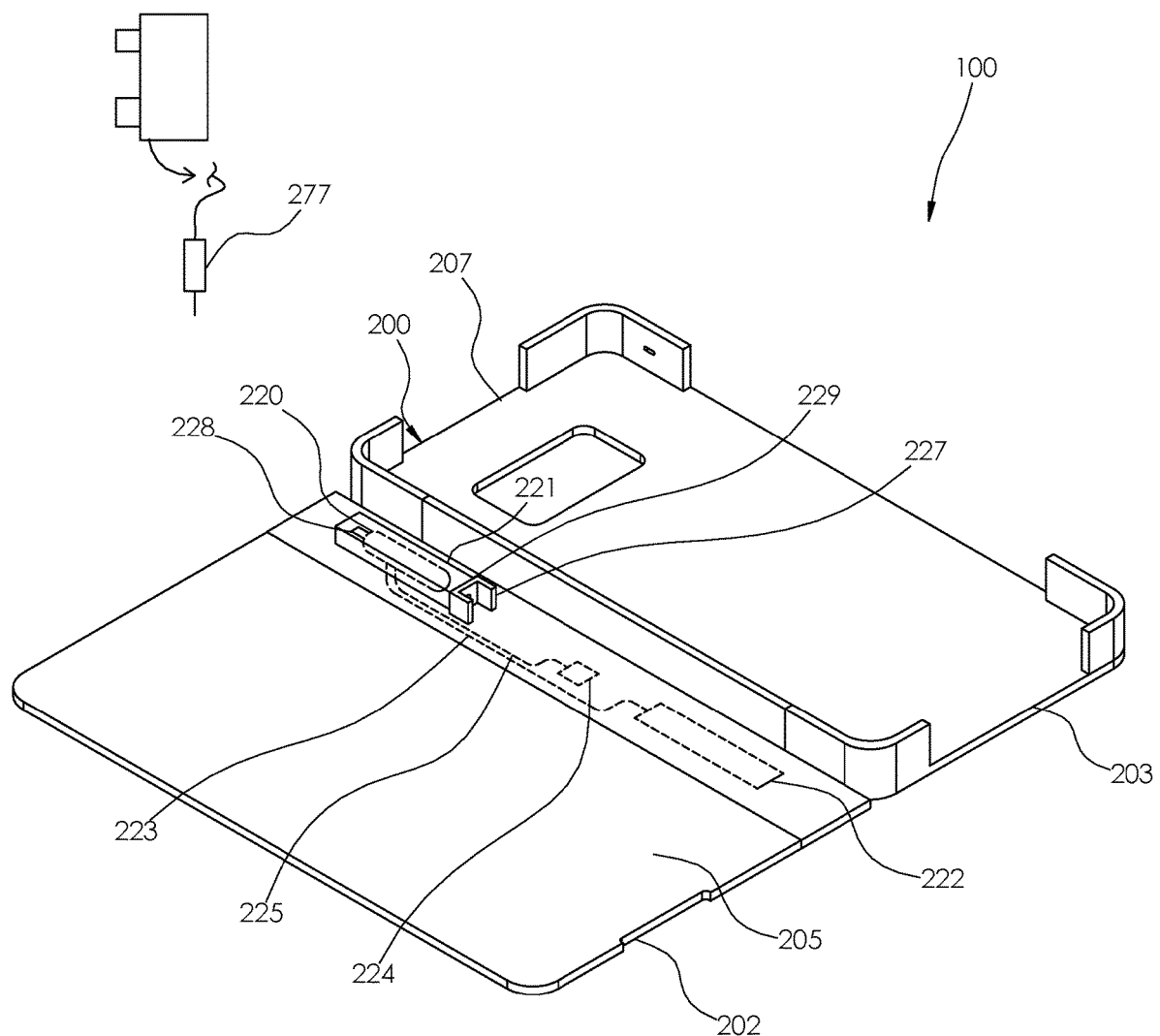
FIG. 6 is a perspective view of the phone case in an open position.
Figure 7:
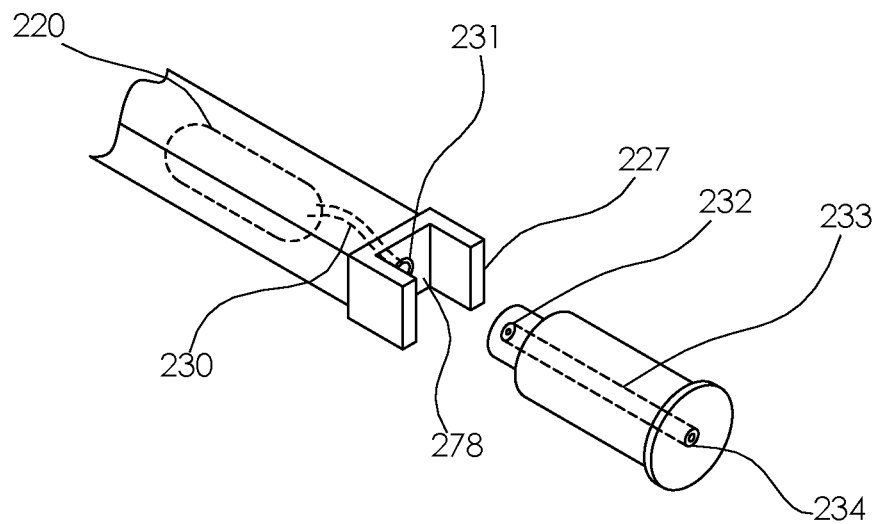
FIG. 7 is a detail view of the bracket and the spring-loaded member.
Figure 8:
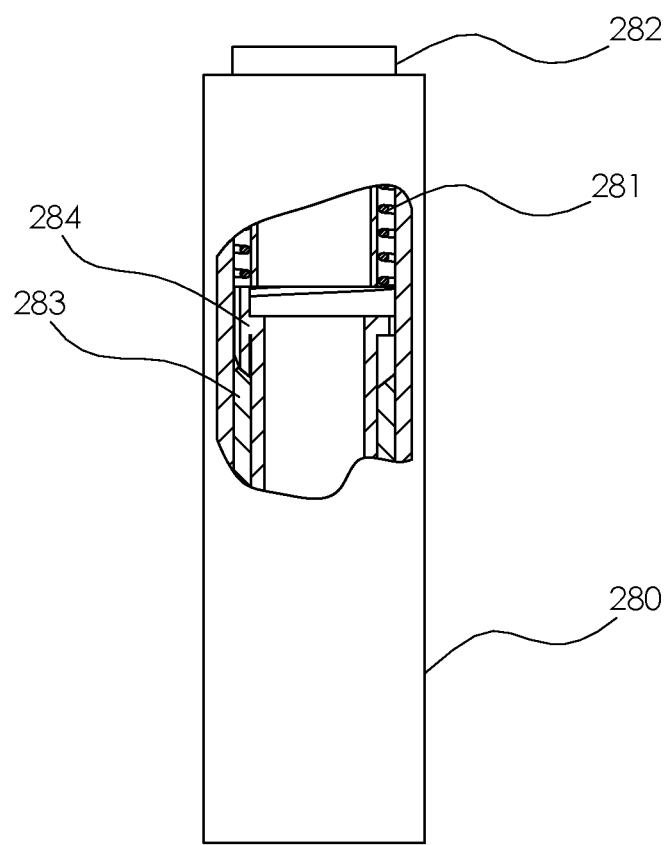
FIG. 8 is a detail view of the spring-loaded member.

The phone case 200 is further defined with an inner surface 205. Referring to FIG. 6, the phone case 200 may be opened to an open position, which exposes the inner surface 205 of the phone case 200. The cell phone 300 is able to be secured against the inner surface 205 of the phone case 200. Moreover, the cell phone 300 is secured against the rear cover 203 portion of the phone case 200.

The hinging side 201 is able to fold flat to enable the phone case 200 in the opened position (see FIG. 6). Moreover, the inner surface 205 supports a battery 220. The battery 220 supports the operation of the vape pen 260. The battery 220 is encased within a housing 221. The housing 221 is affixed to the inner surface 205 of the phone case 200. Moreover, the housing 221 is provided at the hinging side 201 of the phone case 200.

The battery 220 is wired to a battery indicator 222. The battery indicator 222 is provided on the hinging side 201. Moreover, the battery indicator 222 is visible from an exterior surface 206 of the phone case 200. The exterior surface 206 is opposite of the inner surface 205 of the phone case 200. The battery indicator 222 is connected to the battery 220 via an indicator wire 223. The battery 220 is also wired to a control button 224. The control button 224 is accessible from the exterior surface 206 of the phone case 200. Moreover, the control button 224 is connected to the battery 220 via a control wire 225. The control button 224 controls use of the vape pen 260.

Figure 5:
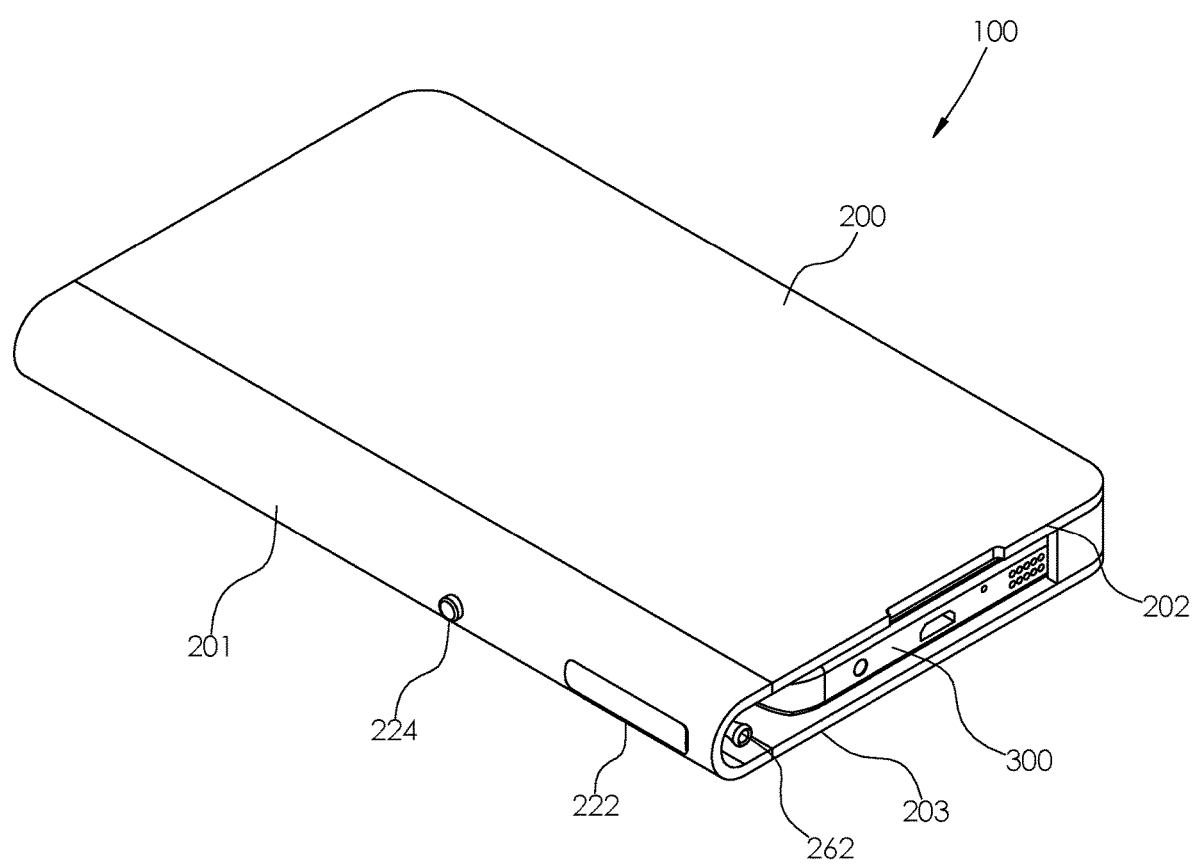
FIG. 5 is another perspective view of the device of FIG. 1.

The housing 221 includes a bracket 227 that is permanently affixed to a first end 228 of the housing 221. The bracket 227 works with a spring-loaded member 2229 to extend and retract the vape pen 260 with respect to the pen slot 261. It shall be noted that FIG. 1 depicts a mouthpiece 262 of the vape pen 260 fully retracted in the pen slot 261; whereas FIG. 5 depicts the mouthpiece 262 of the vape pen 260 extended out of the pen slot 261 so that an end user may use the vape pen 260.

The battery 220 may be a source of electrical energy to operate the vape pen 260. The battery 220 may be replaceable or rechargeable. The battery 220 may include a recharging port 228 provided on a second end 229 of the housing 221. It shall be noted that the second end 229 of the housing 221 is adjacent to a perimeter edge 207 of the phone case 200 so as to enable ease of connection to a power cord 277 for recharging purposes.

It shall be further noted that the invention 100 may employ a wireless charging capability, which is well known in the art. Wireless phone charging is nothing new, and uses an induction coil that charges a battery via electromagnetic induction. The charger (not shown) uses an induction coil to create an alternating electromagnetic field, which the receiver coil in the phone converts back into electricity to be fed into the battery.

The spring-loaded member 2229 is able to affix itself between the vape pen 260 and the bracket 227. The bracket 227 may use a magnet 278 to attract and secure the spring-loaded member 2229 thereto. The battery 220 has vape pen wiring 230 that extends to the bracket 227. The vape pen wiring 230 connects to a bracket wire contact 231, which interface with a first member contact 232 provided on the spring-loaded member 2229. It shall be noted that the spring-loaded member 2229 includes a member wire 233 that extends between the first member contact 232 and a second member contact 234.

The vape pen 260 includes a vaporizer atomizer 265. The vaporizer atomizer 265 connects with and receives electricity from the battery via the second member contact 234.

The spring-loaded member 2229 operates in the same manner as the spring-loaded pen mechanism, which enables a user to click on the pen to extend and retract the pen head. The spring-loaded member 2229 is further defined with an outer housing 280, a spring 281, an extendable member 282, an upper cam 283, and a lower cam 284. Pushing on the mouthpiece 262 of the vape pen 260, will engage the upper cam 283 against the lower cam 284 to either extend or retract the extendable member 282 with respect to the outer housing 280. Pushing on the mouthpiece 262 of the vape pen 260 causes the mouthpiece 262 to either extend from or retract into the pen slot 261 of the invention 100.

The vape pen 260 is further defined with a fluid storage cartridge 264. The vaping fluid may be stored within the fluid storage cartridge 264.

In some embodiments, the vape pen 260 may be detached from the phone case 200 for use. As a non-limiting example, the vape pen 260 may slide out of the phone case 200 to be used and may slide into the phone case 200 when not in use.

The battery indicator 222 may illuminate, extinguish, and blink in order to communicate operational status of the vape pen 260. As non-limiting examples, the battery indicator 222 may illuminate when the vape pen 260 is powered and may blink to signify a low-battery condition.

DEFINITIONS

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used in this disclosure, a "hook and loop fastener" is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface.

As used herein, "mouthpiece" refers to an element that is a designed to have lips placed against it.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A phone case vape pen comprising:
a phone case, and a vape pen;
wherein the phone case is configured to couple to a mobile phone;
wherein the vape pen is able to extend and retract from the phone case as needed for use;
wherein the phone case is further defined with an inner surface;
wherein the phone case is opened to form an open position, which exposes the inner surface of the phone case;
wherein the inner surface of the phone case is configured to interface with the cell phone;
wherein the inner surface of the phone case supports a battery;
wherein the battery supports the operation of the vape pen.

2. The phone case vape pen according to claim 1 wherein the phone case is further defined with a hinging side, a front cover, and a rear cover; wherein the phone case is configured to lie open and flat or fold over to enclose the cell phone when not in use.

3. The phone case vape pen according to claim 2 wherein the hinge side is positioned between the front cover and the rear cover; wherein the phone case forms a pen slot that enables the vape pen to be positioned therein; wherein the pen slot is formed when the hinging side is folded thereby enclosing the phone case.

4. The phone case vape pen according to claim 3 wherein the cell phone is configured to be secured against the rear cover of the phone case.

5. The phone case vape pen according to claim 4 wherein the battery is encased within a housing; wherein the housing is affixed to the inner surface of the phone case; wherein the housing is provided at the hinging side of the phone case.

6. The phone case vape pen according to claim 5 wherein the battery is wired to a battery indicator; wherein the battery indicator is provided on the hinging side; wherein the battery indicator is visible from an exterior surface of the phone case; wherein the exterior surface is opposite of the inner surface of the phone case; wherein the battery indicator is connected to the battery via an indicator wire.

7. The phone case vape pen according to claim 6 wherein the battery is wired to a control button; wherein the control button is accessible from the exterior surface of the phone case; wherein the control button is connected to the battery via a control wire; wherein the control button controls use of the vape pen.

8. The phone case vape pen according to claim 7 wherein the housing includes a bracket that is permanently affixed to a first end of the housing; wherein the bracket works with a spring-loaded member to extend and retract a mouthpiece of the vape pen with respect to the pen slot.

9. The phone case vape pen according to claim 8 wherein the spring-loaded member is able to affix between the vape pen and the bracket; wherein the bracket uses a magnet to attract and secure the spring-loaded member thereto.

10. The phone case vape pen according to claim 9 wherein the battery has vape pen wiring that extends to the bracket; wherein the vape pen wiring connects to a bracket wire contact provided on the bracket; wherein the bracket wire contacts of the bracket interface with a first member contact provided on the spring-loaded member; wherein the spring-loaded member includes a member wire that extends between the first member contact of the spring-loaded member and a second member contact of the spring-loaded member; wherein the first member contact is distal of the second member contact.

11. The phone case vape pen according to claim 10 wherein the vape pen includes a vaporizer atomizer; wherein the vaporizer atomizer connects with and receives electricity from the battery the second member contact of the spring-loaded member.

12. The phone case vape pen according to claim 11 wherein the spring-loaded member is further defined with an outer housing, a spring, an extendable member, an upper cam, and a lower cam; wherein pushing on the mouthpiece of the vape pen, will engage the upper cam against the lower cam to either extend or retract the extendable member with respect to the outer housing; wherein pushing on the mouthpiece of the vape pen causes the mouthpiece to either extend from or retract into the pen slot of the phone case.

13. The phone case vape pen according to claim 12 wherein the vape pen is further defined with a fluid storage cartridge; wherein the vaping fluid is stored within the fluid storage cartridge.

14. The phone case vape pen according to claim 13 wherein the battery includes either a wireless induction coil to wirelessly recharge the battery or a recharging port provided on a second end of the housing; wherein the second end of the housing is adjacent to a perimeter edge of the phone case so as to enable ease of connection to a power cord for recharging purposes.

* * * * *